United States Patent
Gannamaneni (10) Patent No.: US 12,166,412 B2
(45) Date of Patent: Dec. 10, 2024

(54) ON-BOARD CHARGER FOR A BATTERY OF AN ELECTRIC VEHICLE

(71) Applicant: Volvo Car Corporation, Gothenburg (SE)

(72) Inventor: Narendar Rao Gannamaneni, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 525 days.

(21) Appl. No.: 17/517,051

(22) Filed: Nov. 2, 2021

(65) Prior Publication Data

US 2022/0149721 A1    May 12, 2022

(30) Foreign Application Priority Data

Nov. 9, 2020   (EP) .................................... 20206526

(51) Int. Cl.
| | | |
|---|---|---|
| *H02J 7/00* | (2006.01) | |
| *B60L 53/14* | (2019.01) | |
| *B60L 53/20* | (2019.01) | |
| *B60L 53/22* | (2019.01) | |
| *H02J 7/06* | (2006.01) | |

(Continued)

(52) U.S. Cl.
CPC .......... *H02M 1/4208* (2013.01); *B60L 53/14* (2019.02); *B60L 53/20* (2019.02); *B60L 53/22* (2019.02); *H02J 7/06* (2013.01); *H02M 3/01* (2021.05); *H02M 3/33573* (2021.05); *H02M 3/33576* (2013.01); *H02M 3/33584* (2013.01); *B60L 2210/10* (2013.01); *B60L 2210/30* (2013.01); *B60L 2210/40* (2013.01); *H02J 2207/20* (2020.01)

(58) Field of Classification Search
CPC .......... B60L 53/14; B60L 53/20; B60L 53/22; B60L 2210/10; B60L 2210/30; B60L 2210/40; H02M 1/4208; H02M 3/01; H02M 3/33573; H02M 3/33576; H02M 3/33584; H02J 7/06; H02J 2207/20
USPC .................... 320/109; 701/22; 363/17, 21.02
See application file for complete search history.

(56) References Cited

U.S. PATENT DOCUMENTS

| | | | |
|---|---|---|---|
| 2012/0280662 A1* | 11/2012 | Krauer | ..................... H02J 7/04 320/138 |
| 2013/0336013 A1 | 12/2013 | Mueller | |

(Continued)

FOREIGN PATENT DOCUMENTS

| | | |
|---|---|---|
| CN | 104980033 A | 10/2015 |
| CN | 206452300 U | 8/2017 |

(Continued)

OTHER PUBLICATIONS

Extended European Search Report for European Application No. 20206526.4 dated Apr. 16, 2021, 10 pages.

(Continued)

*Primary Examiner* — Zixuan Zhou
(74) *Attorney, Agent, or Firm* — Amin, Turocy & Watson, LLP (57) ABSTRACT

The invention relates to controlling an on-board charger for a battery of an electric vehicle to provide a more flexible output DC voltage range by adjusting a turn ratio of a transformer circuit to selectively integrate or exclude one of two winding portions of a primary winding of the transformer circuit.

20 Claims, 4 Drawing Sheets

(51) Int. Cl.
   *H02M 1/42*      (2007.01)
   *H02M 3/00*      (2006.01)
   *H02M 3/335*     (2006.01)

(56)          References Cited

U.S. PATENT DOCUMENTS

2014/0153290 A1    6/2014  Li et al.
2015/0295504 A1*  10/2015  Tanahashi ......... H02M 3/33584
                                                        307/24
2019/0081572 A1    3/2019  Hatano

FOREIGN PATENT DOCUMENTS

| CN | 107791855 A  | 3/2018  |
| CN | 111756084 A  | 10/2020 |
| JP | 2009-124905 A | 6/2009  |
| JP | 2010-130708 A | 6/2010  |
| JP | 2011-050227 A | 3/2011  |
| JP | 2011-244658 A | 12/2011 |
| JP | 2012085447 A | 4/2012  |

OTHER PUBLICATIONS

First Office Action received for Chinese Patent Application Serial No. 202111252899.2 dated Apr. 23, 2023, 18 pages.
Communication pursuant to Article 94(3) EPC received for European Patent Application No. 20206526.4 dated Sep. 28, 2021, 8 pages.
"G3VM-66M MOS FET Relay Module, MOS FET Relay in Module Package with SPOT", Omron Corporation, 2018, 6 pages.

* cited by examiner

ON-BOARD CHARGER FOR A BATTERY OF AN ELECTRIC VEHICLE

TECHNICAL FIELD

The present invention relates to an on-board charger for a battery of an electric vehicle, a use of an on-board charger, an electric vehicle and a method for controlling an on-board charger.

BACKGROUND ART

Electric vehicles have a battery having a defined rated voltage. At present, the most common rated voltage for batteries of electric vehicles is 400 volts (V), but electric vehicles having a battery of 800V rated voltage are also known. A battery having a rated voltage of 800V, also referred to as a 800V-battery, can provide a higher power density than a battery having a rated voltage of 400V, also referred to as a 400V-battery, of the same size. Further, an 800V-battery can reduce the current carrying conductors' cross-sectional area apart from higher clearances and creepage of the power converter designs. On-board chargers presently used in electric vehicles having a 400V-battery provide an output direct current (DC) voltage range of about 250V to 450V. On-board chargers configured to charge an 800V-battery provide an output DC voltage range of about 600V to 850V.

SUMMARY

There may, therefore, be a need to provide an improved on-board charger for a battery of an electric vehicle and a method for controlling an on-board charger, particularly an on-board charger and/or method for controlling an on-board charger capable of providing a more flexible output DC voltage range.

The object of the present invention is solved by the subject-matter of the appended independent claims, wherein further embodiments are incorporated in the dependent claims.

According to a first aspect, there is provided a, preferably bidirectional, on-board charger for a high voltage battery of an electric vehicle. The on-board charger comprises an input power interface, a power factor correction (PFC) circuit, an isolated direct current/direct current (DC/DC)-converter and an output power interface. The input power interface is connectable to a power source of a charging system, particularly an external charging system, such as a charging station. The power factor correction (PFC) circuit is connected to the input power interface, and the isolated DC/DC-converter is connected to the power factor correction circuit. The output power interface is connected to the DC/DC-converter and configured to be connected to the battery of the electric vehicle. The power factor correction circuit is configured to vary an output voltage in a defined range, wherein the output voltage is provided at an output voltage link of the PFC circuit. The DC/DC-converter comprises a bridge circuit being connected to the output voltage link of the PFC circuit, a transformer circuit being connected to the bridge circuit, and a rectifier circuit being connected to the transformer circuit. The transformer circuit comprises at least a transformer comprising a primary winding connected to the bridge circuit, and a secondary winding connected to the rectifier circuit. At least one of the primary winding and the secondary winding comprises a center-tap dividing the at least one of the primary and the secondary winding into two winding portions, the two winding portions being connected to a switch circuit which is configured to change a turn ratio of the transformer by selectively integrating or excluding one of the two winding portions from the conductive circuit.

By changing the turn ratio of the transformer, the best performance of the DC/DC-converter at different operating points, e.g. 400V and 800V, is achieved. Further, a gain of the DC/DC-converter can be maintained substantially constant, preferably close to unity, for all achievable operating points. This enables a switching frequency of the DC/DC-converter to be close to the resonant frequency, thus, increasing the efficiency of the DC/DC-converter. Further, a sinusoidal wave shape of a primary current of the transformer, namely the current of the primary winding, can be maintained with less harmonics reducing an impact of radiated emissions from the DC/DC-converter. The variation of the output voltage at the output voltage link of the PFC circuit allows much more flexibility in choosing the best operating point with regard to efficiency. The assembly of the on-board charger, particularly the combination of the PFC circuit and the isolated DC/DC-converter allows a two stage power conversion: the first state corresponds to the PFC circuit and the second state corresponds to the isolated DC/DC-converter. The isolated DC/DC-converter controls the charging operation and additionally provides isolation from the input AC at the input power interface.

According to an embodiment, the bridge circuit may be a full bridge circuit and/or may have a first bridge branch and a second bridge branch in parallel with each other, each of the first and the second bridge branch comprising a pair of serially connected MOSFETs.

The bridge circuit may be a switching circuit converting the output voltage of the PFC circuit, which is a direct current (DC) output voltage, into an alternating current (AC) voltage. The AC voltage may be supplied to the transformer circuit. The gain of the bridge circuit may be adapted such that a direct current (DC) output voltage provided at the output power interface may vary.

According to an embodiment, the rectifier circuit may be configured as a bridge circuit comprising a first rectifier branch and a second rectifier branch connected in parallel with each other, each of the first and the second rectifier branches comprising a pair of serially connected MOSFETs.

The rectifier circuit may act as the bridge circuit, in case the bidirectional on-board charger may not be used to charge a battery but to supply an output voltage from the battery to an external device being connected to the input power interface. In case of the common use of the on-board charger, namely charging the battery, the rectifier circuit may convert the AC voltage of the transformer into DC voltage being output at the output power interface.

According to an embodiment, the primary winding may comprise the center-tap dividing the primary winding into two primary winding portions, and wherein the switch circuit may comprise a first switch branch and a second switch branch in parallel with each other, the first switch branch connecting the center-tap to the first bridge branch between the two MOSFETs, and the second switch branch connecting the one end of the primary winding or an end of one of the two primary winding portions to the first bridge branch, also between the two MOSFETs.

The total gain of the bridge circuit may be modified such that the DC output voltage at the output power interface may be varied to achieve a defined value.

The first switch branch may comprise a pair of MOSFETs arranged in series back-to-back and the second switch branch may comprise a pair of MOSFETs arranged in series back-to-back. Each pair of back-to-back (B2B) MOSFETs may allow integrating either the first switch branch or the second switch branch into the conductive circuit. For integrating the first switch branch, the pair of B2B MOSFETs of the first switch branch is permanently closed, meaning both MOSFETs forming the pair are permanently closed, while the pair of B2B MOSFETs of the second branch is permanently opened. For integrating the second switch branch, the pair of B2B MOSFETs of the first switch branch is permanently opened, meaning both MOSFETs forming the pair are permanently opened, while the pair of B2B MOSFETs of the second branch is permanently closed.

Additionally, according to an embodiment, another end of the primary winding, or an end of the other one of the two primary winding portions, may be connected to the second bridge branch, preferably between the two MOSFETs, via a first capacitor connected in series.

The first capacitor may stabilize the preferably sinusoidal wave shape of the primary current. Thus, to provide the output voltage at the output power interface of a first value, e.g. 800V, the pair of B2B MOSFETs of the first switch branch may be permanently closed and the pair of B2B MOSFETs of the second switch branch may be permanently opened, resulting in a first turn ratio of the transformer. The first turn ratio of the transformer may be defined by a ratio of a number of turns of the one primary winding portion and a number of turns of the secondary winding. Alternatively, to provide the output voltage at the output power interface of a second value, e.g. 400V, the pair of B2B MOSFETs of the first switch branch may be permanently opened and the pair of B2B MOSFETs of the second switch branch may be permanently closed, resulting in a second turn ratio of the transformer. The second turn ratio of the transformer may be defined by a ratio of a number of turns of the primary winding and the number of turn of the secondary winding. The number of turn of the primary winding may be the sum of the number of turns of the one primary winding portion and a number of turn of the other primary winding portion. The second turn ratio may be smaller than the first turn ratio due to the additional number of turn of the other primary winding portion.

According to an embodiment, one end of the secondary winding is connected to the first rectifier branch between the two MOSFETs and the other end of the secondary winding is connected to the second rectifier branch between the two MOSFETs.

For achieving both, a 400V-output voltage and an 800V-output voltage at the output power interface, any of the two pairs of B2B MOSFETs may be permanently closed such that losses may only occur during conduction. The switching losses may be substantially zero and the losses during conduction may be dependent on the on-resistances of the MOSFETs. The smaller the on-resistances of the MOSFETs, the smaller the losses during conduction. According to the assembly described above, the 800V-output voltage may have fewer losses during conduction than the 400V-output voltage because the primary current in the primary winding of the transformer may be reduced for the 800V-output voltage.

Alternatively, according to another embodiment, the secondary winding may comprise the center-tap dividing the secondary winding into two secondary winding portions, and wherein the switch circuit may comprise a first switch branch and a second switch branch in parallel with each other, the first switch branch connecting the center-tap to the first rectifier branch between the two MOSFETs, and the second switch branch connecting the one end of the secondary winding, or an end of one of the two secondary winding portions, to the first rectifier branch, preferably also between the two MOSFETs.

This embodiment is preferably used in case the battery of the electric vehicle may be used for supplying power to an external device coupled to the input power interface, but may also achieve different turn ratios of the transformer allowing a wider spectrum of transformers being applicable in the on-board charger.

The first switch branch may comprise a pair of MOSFETs arranged in series back-to-back and the second switch branch may comprise a pair of MOSFETs arranged in series back-to-back. Each pair of back-to-back (B2B) MOSFETs may allow integrating either the first switch branch or the second switch branch into the conductive circuit. For integrating the first switch branch, the pair of B2B MOSFETs of the first switch branch is permanently closed, meaning both MOSFETs forming the pair are permanently closed, while the pair of B2B MOSFETs of the second switch branch is permanently opened. For integrating the second switch branch, the pair of B2B MOSFETs of the first switch branch is permanently opened, meaning both MOSFETs forming the pair are permanently opened, while the pair of B2B MOSFETs of the second branch is permanently closed.

Additionally, according to an embodiment, another end of the secondary winding, or an end of the other one of the two secondary winding portions, is connected to the second rectifier branch via a second capacitor connected in series.

Thus, the turn ratio of the transformer may be changed by changing the number of turns of the secondary winding instead of changing the number of turns of the primary winding. The second capacitor may stabilize the preferably sinusoidal wave shape of the secondary current.

Alternatively, according to another embodiment the primary winding and the secondary winding each may comprise a center-tap dividing the winding into two winding portions. A primary switch circuit may comprise a first primary switch branch and a second primary switch branch in parallel with each other, the first primary switch branch connecting the center-tap of the primary winding to the first bridge branch between the two MOSFETs, and the second primary switch branch connecting the one end of the primary winding, or an end of one of the two primary winding portions, to the first bridge branch, preferably between the two MOSFETs. A secondary switch circuit may comprise a first secondary switch branch and a second secondary switch branch in parallel with each other, the first secondary switch branch connecting the center-tap of the secondary winding to the first rectifier branch between the two MOSFETs, and the second secondary switch branch connecting the one end of the secondary winding, or an end of one of the two secondary winding portions, to the first rectifier branch, preferably between the two MOSFETs.

This embodiment may be a combination of the preceding described embodiments, and may change the turn ratio of the transformer by changing the number of turn of the primary winding and/or by changing the number of turn of the secondary winding. Such assembly may provide full advantage during bidirectional power transfer.

According to an embodiment, another end of the primary winding, or an end of the other one of the two primary winding portions, may be connected to the second bridge branch via a first capacitor connected in series and another end of the secondary winding, or an end of the other one of the two secondary winding portions, may be connected to the second rectifier branch via a second capacitor connected in series.

The first capacitor may stabilize the preferably sinusoidal wave shape of the primary current and the second capacitor may stabilize the preferably sinusoidal wave shape of the secondary current.

According to an embodiment, the bridge circuit may further comprise a third capacitor connected in parallel to the first and the second bridge branch and the rectifier circuit may further comprise a fourth capacitor connected in parallel to the first and the second rectifier branch.

The third and the fourth capacitors may smooth the voltage of the bridge circuit and the rectifier circuit, respectively.

According to an embodiment, the on-board charger may be a single phase, bidirectional on-board charger.

According to a second aspect, there is provided a use of an on-board charger according to the first aspect in an electric vehicle having a 400V-battery system and/or in an electric vehicle having an 800V-battery system.

The on-board charger according to the first aspect may be applicable to an electric vehicle having a 400V-battery system as well as in an electric vehicle having an 800V-battery system without the need of any adaptations.

According to a third aspect, there is provided an electric vehicle, comprising a battery, and an on-board charger according to the first aspect, wherein the output power interface of the on-board charger is connected to the battery.

According to a fourth aspect, there is provided a method for controlling an on-board charger for a high voltage battery of an electric vehicle, the method comprising the following steps, not necessarily in this order:
  connecting an input power interface to a power source of a charging system having a first alternating current (AC) output voltage;
  converting the first AC output voltage into a first direct current (DC) output voltage by means of a power factor correction circuit connected to the input power interface and varying the first DC output voltage of the power factor correction circuit in a defined range,
  providing the first DC output voltage at an output voltage link of the power factor correction circuit connected to a bridge circuit of an isolated direct current/direct current (DC/DC)-converter,
  converting the first DC output voltage into a second AC output voltage by means of the bridge circuit,
  adapting a turn ratio of a transformer comprising a primary winding and a secondary winding, wherein at least one of the primary winding and the secondary winding comprises a center-tap dividing the at least one of the primary and the secondary winding into two winding portions, the two winding portions being connected to a switch circuit which is configured to change a turn ratio of the transformer by selectively integrating or excluding one of the two winding portions from the conductive circuit for changing the output voltage of the second AC transmitted from the primary winding to the secondary winding,
  converting the second AC output voltage into a second DC output voltage by means of a rectifier circuit connected to the transformer circuit, and
  providing the second DC output voltage at an output power interface connected to the battery of the electric vehicle.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

The method enables the use of an on-board charger in at least two battery systems having different voltages. By changing the turn ratio of the transformer, the best performance of the DC/DC-converter at different operating points, e.g. 400V and 800V, is achieved. Further, a gain of the DC/DC-converter can be maintained substantially constant, preferably close to unity, for all achievable operating points. This enables a switching frequency of the DC/DC-converter to be close to the resonant frequency, thus, increasing the efficiency of the DC/DC-converter. Further, a sinusoidal wave shape of a primary current of the transformer can be maintained with less harmonics reducing an impact of radiated emissions from the DC/DC-converter. The variation of the output voltage at the output voltage link of the PFC circuit allows much more flexibility in choosing the best operating point with regard to efficiency.

It should be noted that the above embodiments may be combined with each other irrespective of the aspect involved. Accordingly, the method may be combined with structural features and, likewise, the on-board charger may be combined with features described above with regard to the method.

These and other aspects of the present invention will become apparent from and elucidated with reference to the embodiments described hereinafter.

BRIEF DESCRIPTION OF DRAWINGS

Exemplary embodiments of the invention will be described in the following with reference to the following drawings.

The figures are merely schematic representations and serve only to illustrate embodiments of the invention. Identical or equivalent elements are in principle provided with the same reference signs.

DESCRIPTION OF EMBODIMENTS

Figure 1:
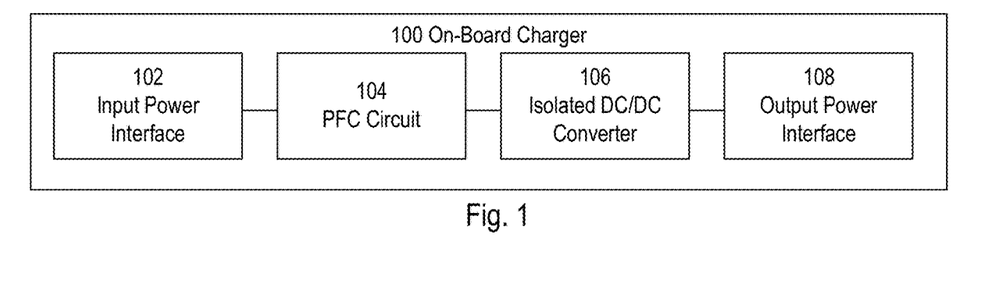
FIG. 1 shows a schematic view of an exemplary embodiment of an on-board charger for a battery of an electric vehicle.

FIG. 1 shows an embodiment of an on-board charger 100 for a battery (not illustrated) of an electric vehicle (not illustrated) in a schematic block diagram. The on-board charger 100 comprises an input power interface 102, a power factor correction (PFC) circuit 104, an isolated direct current/direct current (DC/DC)-converter 106, and an output power interface 108.

The input power interface 102 is connectable to a power source of a charging system, e.g. an external charging station (not illustrated) providing alternating current (AC) voltage. The PFC circuit 104 is connected to the input power interface 102 and configured to convert the AC voltage from the input power interface 102 into a DC output voltage, and to vary the DC output voltage in a defined range. The DC output voltage is provided at an output voltage link 110 (see FIG. 2) of the PFC circuit 102, the output voltage link 110 being connected to the isolated DC/DC-converter 106. The isolated DC/DC-converter 106 is configured to convert the DC voltage supplied by the output voltage link 110 into a DC voltage being supplied to the battery of the electric vehicle by the output power interface 108.

Figure 2:
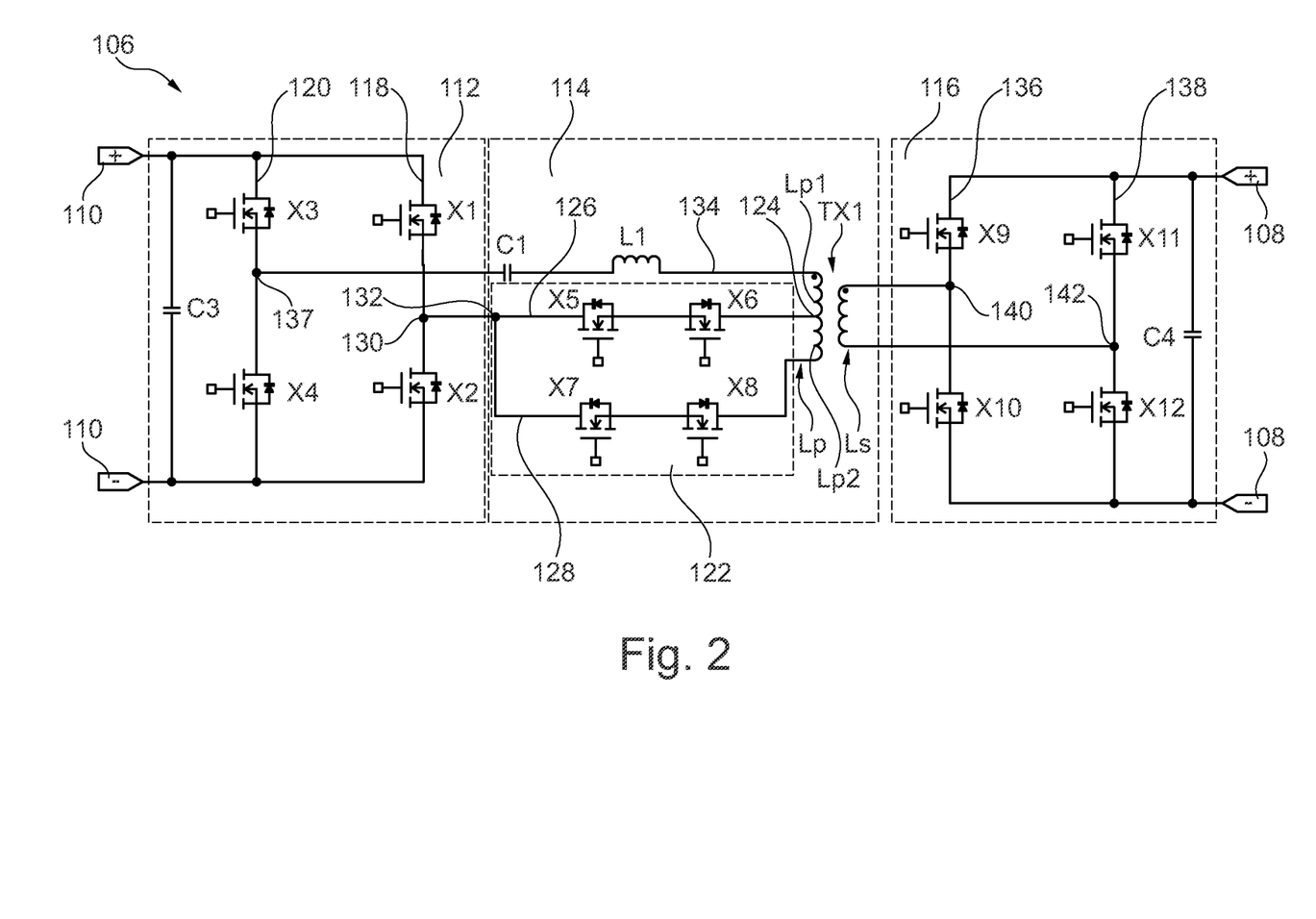
FIG. 2 shows a schematic view of an exemplary embodiment of an isolated DC/DC-converter of an on-board charger for a battery of an electric vehicle.

FIG. 2 shows a schematic view of the isolated DC/DC-converter 106 of the on-board charger 100. According to an embodiment, the DC/DC-converter 106 comprises a bridge circuit 112, a transformer circuit 114, and a rectifier circuit 116.

The bridge circuit 112 is connected to the output voltage link 110 of the PFC circuit 104. According to an embodiment, the bridge circuit 112 is a full bridge circuit and has a first bridge branch 118 and a second bridge branch 120 in parallel with each other. The first bridge branch 118 comprises a pair of MOSFETs X1, X2 connected in series, and the second bridge branch 120 comprises a pair of MOSFETs X3, X4 connected in series. Further, the bridge circuit 112 comprises a capacitor C3 connected in parallel to the first and the second bridge branch 118, 120, the capacitor C3 being configured to smooth the DC output voltage supplied by the output voltage link 110. The bridge circuit 112 is configured as a switching bridge converting the DC output voltage into an AC voltage.

The transformer circuit 114 is connected to the bridge circuit 112. According to an embodiment, the transformer circuit 114 comprises a transformer TX1 and a switch circuit 122. The transformer TX1 comprises a primary winding Lp and a secondary winding Ls, wherein the primary winding Lp is divided by a center-tap 124 into a first primary winding portion Lp1 and a second primary winding portion Lp2. The transformer TX1 is configured to convert a primary AC voltage into a secondary AC voltage by means of a turn ratio of the transformer. The turn ratio is defined as a ratio of a number of turns Np of the primary winding Lp and a number of turns Ns of the secondary winding Ls. The number of turns Np of the primary winding Lp is the sum of a number of turns Np1 of the first primary winding portion Lp1 and a number of turns Np2 of the second primary winding portion Lp2.

The primary winding portions Lp1 and Lp2 are connected to the switch circuit 122, which is configured to change a turn ratio of the transformer TX1 by selectively integrating or excluding the second primary winding portion Lp2 into or from a conductive circuit of a primary current of the DC/DC-converter 106.

The switch circuit 122 comprises a first switch branch 126 and a second switch branch 128 in parallel with each other. The first switch branch 126 comprises a pair of serially connected MOSFETs X5, X6 arranged back-to-back, and connects the center-tap 124 to the first bridge branch 118 at an intermediate point 130 between the MOSFETs X1, and X2. The second switch branch 128 also comprises a pair of serially connected MOSFETs X7, X8 arranged back-to-back, and connects an end of the second primary winding portion Lp2 to the first bridge branch 118, here by connecting the second switch branch 128 to the first switch branch 126 at an intermediate point 132 between the intermediate point 130 and the MOSFET X5. A connecting branch 134 connects an end of the first primary winding portion Lp1 to the second bridge branch 120 at an intermediate point 137 between the MOSFETs X3 and X4. According to an embodiment, the connecting branch 134 comprises a capacitor C1 and an inductivity L1, e.g. an electromagnetic coil.

The switch circuit 122 is configured to keep the pair of serially connected back-to-back (B2B) MOSFETs X5, X6 closed and the pair of serially connected back-to-back (B2B) MOSFETs X7, X8 opened, or vice versa.

In case, the B2B MOSFETs X5 and X6 are closed and the B2B MOSFETs X7 and X8 are opened, the conductive circuit of the primary AC voltage only includes the first primary winding portion Lp1, thus a first turn ratio of the transformer TX1 corresponds to Np1:Ns.

In case, the B"B MOSFETs X5 and X6 are opened and the B2B MOSFETs X7 and X8 are closed, the conductive circuit of the primary AC voltage includes both, the first primary winding portion Lp1 and the second primary winding portion Lp2. Therefore, a second turn ratio of the transformer TX1 corresponds to (Np1+Np2):Ns. Thus, the second turn ratio is smaller than the first turn ratio. A smaller turn ratio of the transformer TX1 results in a lower secondary AC voltage by a constant primary AC voltage. For example, the primary AC voltage is 400V and the turn ratio is 1:1, the secondary AC voltage corresponds to 400V, whereas when the primary AC voltage is still 400V, but the turn ratio is 1:2, the secondary AC voltage corresponds to 800V.

The rectifier circuit 116 is connected to the transformer circuit 114, particularly to the secondary winding Ls of the transformer TX1. According to an embodiment, the rectifier circuit 116 is configured as a switching bridge converting the AC voltage of the secondary winding Ls into a DC output voltage being output on the output power interface 108, which is connected to the rectifier circuit 116. The rectifier circuit 116 has a first rectifier branch 136 and a second rectifier branch 138 in parallel with each other. The first rectifier branch 136 comprises a pair of MOSFETs X9, X10 connected in series, and the second rectifier branch 138 comprises a pair of MOSFETs X11, X12 connected in series. Further, the rectifier circuit 116 comprises a capacitor C4 connected in parallel to the first and the second rectifier branch 136, 138, the capacitor C4 being configured to smooth the DC output voltage supplied to the output power interface 108.

One end of the secondary winding Ls is connected to the first rectifier branch 136 at an intermediate point 140 between the MOSFETs X9 and X10 and the other end of the secondary winding Ls is connected to the second rectifier branch 138 at an intermediate point 142 between the MOSFETs X11 and X12.

According to further embodiments, the connections between the bridge circuit 112, the transformer circuit 114 and the rectifier circuit 116 may be reversed, meaning, the connecting branch 134 may be connected to the first bridge branch 118 and the switch branches 126, 128 may be connected to the second bridge branch 120 and/or the connecting branch 134 may be connected to the end of the second primary winding Lp2 and the second switch branch 128 may be connected to the end of the first primary winding Lp1. Consequently, all connections having the same effects as the exemplary embodiment described with regard to FIG. 2 are possible and therefore, not further described for the sake of brevity.

Figure 3:
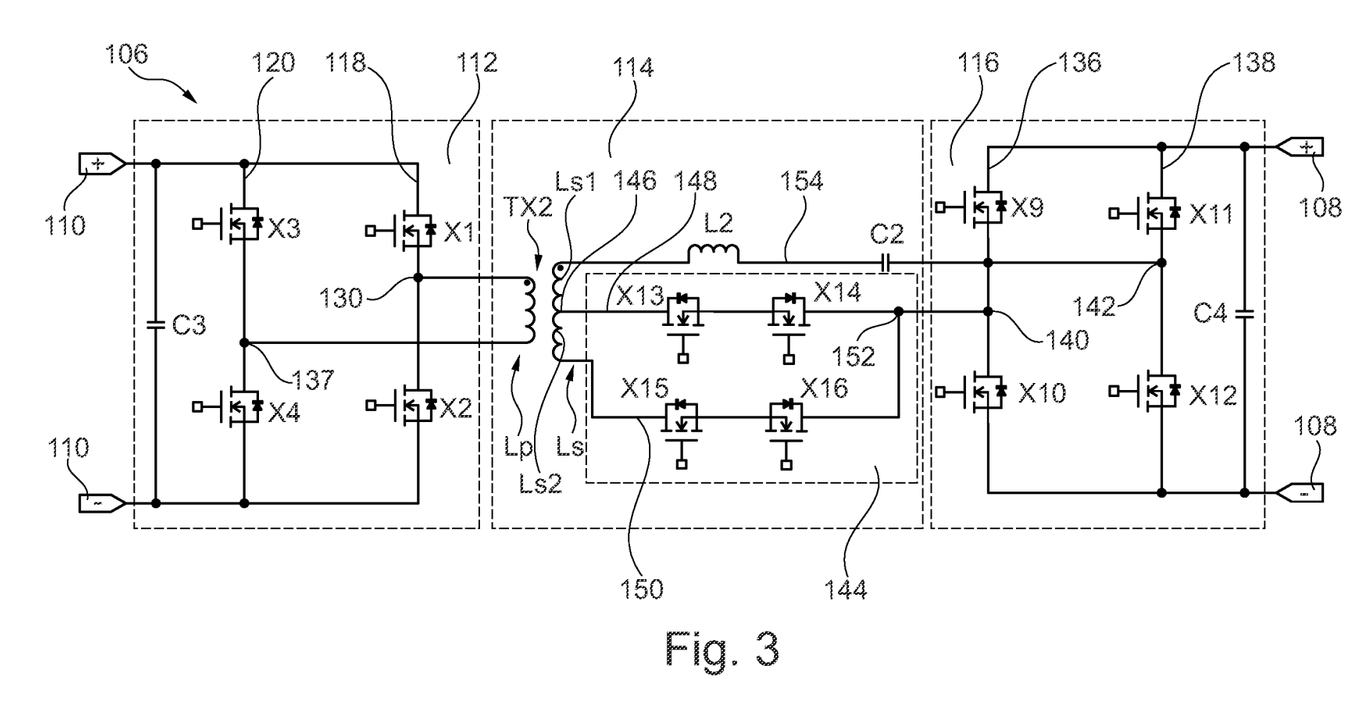
FIG. 3 shows a schematic view of another exemplary embodiment of an isolated DC/DC-converter of an on-board charger for a battery of an electric vehicle.

FIG. 3 shows a schematic view of the isolated DC/DC-converter 106 of the on-board charger 100. According to another embodiment, the DC/DC-converter 106 comprises the bridge circuit 112, the transformer circuit 114 and the rectifier circuit 116 and substantially corresponds to the embodiment described with regard to FIG. 2, and only differs in the assembly of the transformer circuit 114. Therefore, for the sake of brevity, only the differences will be described in the following.

According to another embodiment, the transformer circuit 114 comprises a transformer TX2 and a switch circuit 144. The transformer TX2 comprises a primary winding Lp and a secondary winding Ls, wherein the secondary winding Ls is divided by a center-tap 146 into a first secondary winding portion Ls1 and a second secondary winding portion Ls2. Such an embodiment is preferably used for transferring power from the battery (not illustrated) to an external device (not illustrated) connected to the input power interface 104. Thus, the transformer TX2 is configured to convert the secondary AC voltage into primary AC voltage by means of the turn ratio of the transformer, wherein the turn ratio according to this embodiment is defined as a ratio of the number of turns Ns of the secondary winding Ls and the number of turns Np of the primary winding Lp. The number of turns Ns of the secondary winding Ls is the sum of a number of turns Ns1 of the first secondary winding portion Ls1 and a number of turns Ns2 of the second secondary winding portion Ls2.

The secondary winding portions Ls1 and Ls2 are connected to the switch circuit 144, which is configured to change a turn ratio of the transformer TX2 by selectively integrating or excluding the second secondary winding portion Ls2 into or from a conductive circuit of the secondary current of the DC/DC-converter 106.

The switch circuit 144 comprises a first switch branch 148 and a second switch branch 150 in parallel with each other. The first switch branch 148 comprises a pair of serially connected MOSFETs X13, X14 arranged back-to-back, and connects the center-tap 146 to the first rectifier branch 136 at the intermediate point 140 between the MOSFETs X9 and X10. The second switch branch 150 also comprises a pair of serially connected MOSFETs X15, X16 arranged back-to-back, and connects an end of the second secondary winding portion Ls2 to the first rectifier branch 136, here by connecting the second switch branch 150 to the first switch branch 148 at an intermediate point 152 between the intermediate point 140 and the MOSFET X14. A connecting branch 154 connects an end of the first secondary winding portion Ls1 to the second rectifier branch 138 at the intermediate point 142 between the MOSFETs X11 and X12. According to an embodiment, the connecting branch 154 comprises a capacitor C2 and an inductivity L2, e.g. an electromagnetic coil.

The switch circuit 144 is configured analogously to the switch circuit 122 described with regard to FIG. 2.

The bridge circuit 112 is connected to the transformer circuit 114, particularly to the primary winding Lp of the transformer TX2. One end of the primary winding Lp is connected to the first bridge branch 118 at the intermediate point 130 between the MOSFETs X1 and X2 and the other end of the primary winding Lp is connected to the second bridge branch 120 at the intermediate point 137 between the MOSFETs X3 and X4.

According to further embodiments, the connections between the bridge circuit 112, the transformer circuit 114 and the rectifier circuit 116 may be reversed, meaning, the connecting branch 154 may be connected to the first rectifier branch 136 and the switch branches 148, 150 may be connected to the second rectifier branch 138 and/or the connecting branch 154 may be connected to the end of the second secondary winding Ls2 and the second switch branch 150 may be connected to the end of the first secondary winding Ls1. Consequently, all connections having the same effects as the exemplary embodiment described with regard to FIG. 3 are possible and therefore, not further described for the sake of brevity.

Figure 4:
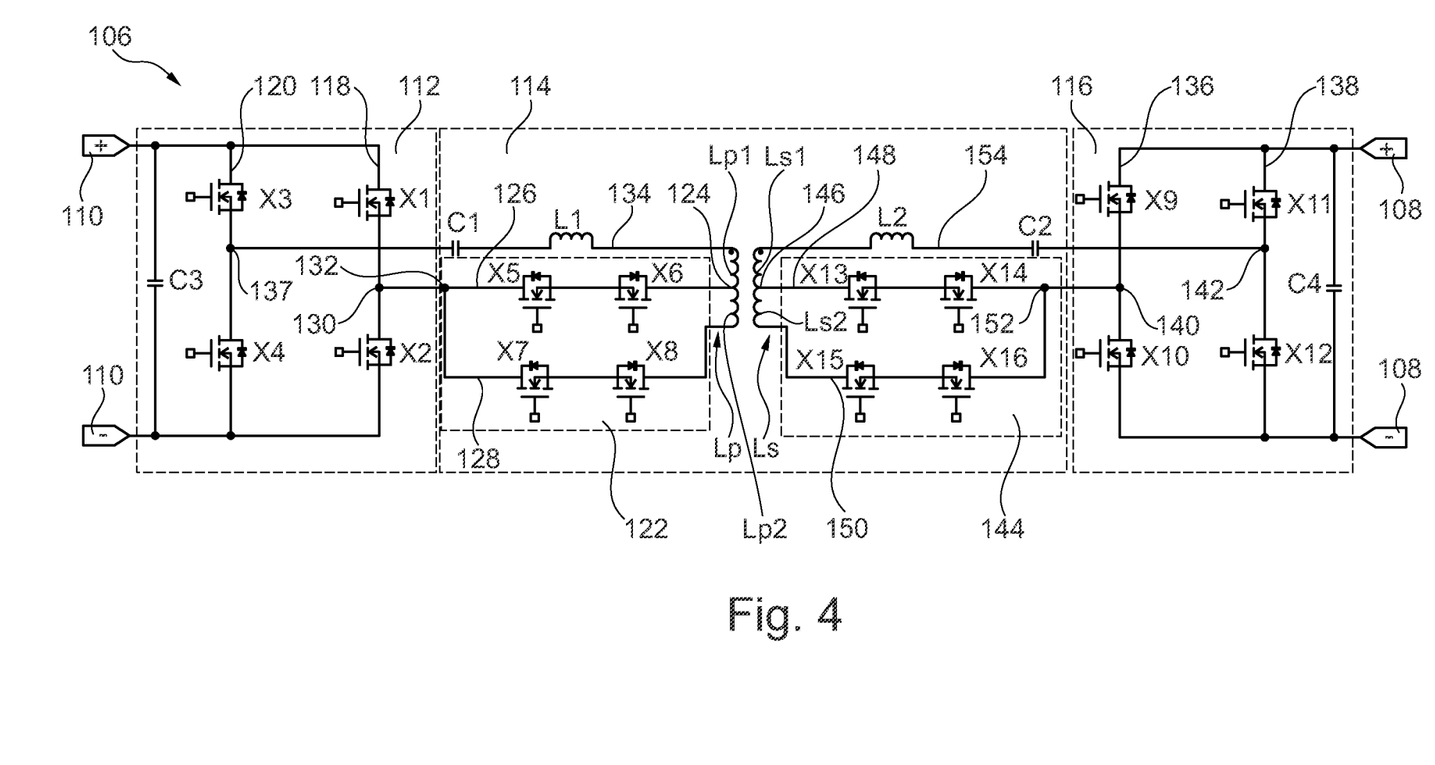
FIG. 4 shows a schematic view of another exemplary embodiment of an isolated DC/DC-converter of an on-board charger for a battery of an electric vehicle.

FIG. 4 shows a schematic view of another exemplary embodiment of the isolated DC/DC-converter 106 of the on-board charger 100. The embodiment as shown in FIG. 4, corresponds to a combination of the embodiment shown in FIGS. 2 and 3. In particular, the embodiment shown in FIG. 4 combines the assembly of the side of the primary winding Lp according to the embodiment described with regard to FIG. 2 and the assembly of the side of the secondary winding Ls according to the embodiment described with regard to FIG. 3. That means, the transformer circuit 114, as shown in FIG. 4, comprises a transformer TX3 having a center-tapped primary winding Lp, as exemplarily shown in FIG. 2, and a center-tapped secondary winding Ls, as exemplarily shown in FIG. 3. Consequently, the transformer circuit 114 according to the embodiment shown in FIG. 4, further comprises the switch circuit 122 connecting the center-tapped primary winding Lp to the bridge circuit 112 as outlined with regard to FIG. 2, and the switch circuit 144 connecting the center-tapped secondary winding Ls to the rectifier circuit 116 as outlined with regard to FIG. 3. This embodiment allows getting the full advantage during bidirectional power transfer.

Figure 5:
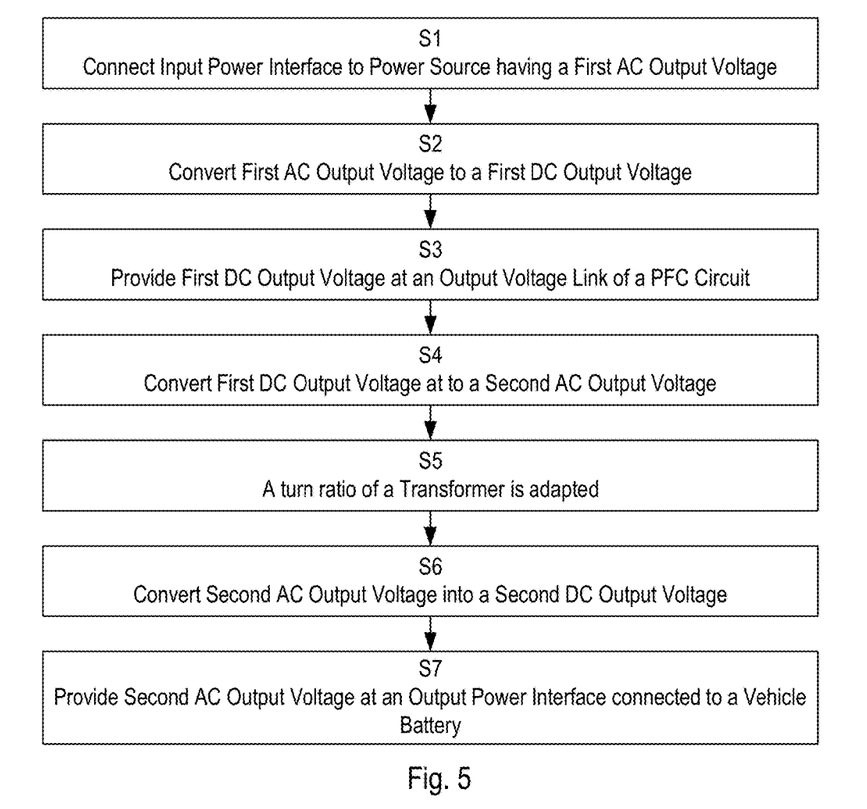
FIG. 5 shows a flowchart, schematically illustrating an exemplary embodiment of a method for controlling an on-board charger for a battery of an electric vehicle.

FIG. 5 shows a flowchart, schematically illustrating an exemplary embodiment of a method 1000 for controlling an on-board charger 100 for a battery of an electric vehicle. The method 1000 comprises the following steps, not necessarily in this order:

In a step S1, the input power interface 102 is connected to a power source of a charging system having a first AC output voltage. In a step S2, the first AC output voltage is converted into a first DC output voltage by means of the PFC circuit 104 connected to the input power interface 102 and the first DC output voltage of the PFC circuit 104 is varied in a defined range. In a step S3 the first DC output voltage is provided at an output voltage link 110 of the PFC circuit 104, which is connected to the bridge circuit 112 of the isolated DC/DC-converter 106. Then, in a step S4, the first DC output voltage is converted into a second AC output voltage by means of the bridge circuit 112. In a step S5, a turn ratio of the transformer TX1, TX2, TX3 is adapted. The transformer comprises the primary winding Lp and the secondary winding Ls, wherein at least one of the primary winding Lp and the secondary winding Ls comprises a center-tap 124, 146 dividing the at least one of the primary and the secondary winding Lp, Ls into two winding portions Lp1, Lp2; Ls1, Ls2, the two winding portions Lp1, Lp2; Ls1, Ls2 being connected to a switch circuit 122, 144 which is configured to change a turn ratio of the transformer TX1, Tx2,TX3 by selectively integrating or excluding one of the two winding portions Lp1, Lp2; Ls1, Ls2 from the conductive circuit for changing the output voltage of the second AC transmitted from the primary winding Lp to the secondary winding Ls. In a step S6, the second AC output voltage is converted into a second DC output voltage by means of the rectifier circuit 116 connected to the transformer circuit 114, and in a step S7, the second DC output voltage is provided at an output power interface connected to the battery of the electric vehicle.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 100 on-board charger
102 input power interface
104 power factor correction circuit
106 direct current/direct current-converter
108 output power interface
110 output voltage link
112 bridge circuit
114 transformer circuit
116 rectifier circuit
118 first bridge branch
120 second bridge branch
122 switch circuit
124 center-tap
126 first switch branch
128 second switch branch
130 intermediate point
132 intermediate point
134 connecting branch
136 first rectifier branch
137 intermediate point
138 second rectifier branch
140 intermediate point
142 intermediate point
144 switch circuit
146 center-tap
148 first switch branch
150 second switch branch
152 intermediate point
154 connecting branch
C1, C2, C3, C4 conductor
L1, L2 inductivity
X1 to X16 MOSFET
TX1, TX2, TX3 transformer
Lp primary winding
Lp1, Lp2 primary winding portion
Ls secondary winding
Ls1, Ls2 secondary winding portion
Np, Np1, Np2 number of turns
Ns, Ns1, Ns2 number of turns

The invention claimed is:

1. An on-board charger for a battery of an electric vehicle, comprising:
an input power interface being connectable to a power source of a charging system;
a power factor correction circuit connected to the input power interface;
an isolated direct current/direct current-converter connected to the power factor correction circuit; and
an output power interface connected to the isolated direct current/direct current-converter and configured to be connected to the battery of the electric vehicle,
wherein the power factor correction circuit being configured to vary an output voltage in a defined range, the output voltage being provided at an output voltage link of the power factor correction circuit,
wherein the isolated direct current/direct current converter comprising:
a bridge circuit connected to the output voltage link of the power factor correction circuit,
a transformer circuit connected to the bridge circuit, and
a rectifier circuit connected to the transformer circuit,
wherein the transformer circuit comprising at least a transformer comprising a primary winding connected to the bridge circuit, and a secondary winding connected to the rectifier circuit, and
wherein the primary winding comprising a center-tap dividing the primary into two winding portions, the two winding portions of the primary winding being connected to a primary switch circuit of a switch circuit being configured to change a turn ratio of the transformer circuit by selectively integrating or excluding one of the two winding portions, and
wherein the primary switch circuit comprising a first primary switch branch and a second primary switch branch in parallel with each other, the first primary switch branch connecting the center-tap to the first primary bridge branch between two MOSFETs, and the second primary switch branch connecting one end of the primary winding to the first primary bridge branch.

2. The on-board charger according to claim 1, the second primary bridge branch comprising a pair of serially connected MOSFETs.

3. The on-board charger according to claim 1, the rectifier circuit comprising a first rectifier branch and a second rectifier branch connected in parallel with each other, each of the first and the second rectifier branches comprising a pair of serially connected MOSFETs.

4. The on-board charger according to claim 1, another end of the primary winding being connected to the second primary bridge branch via a first capacitor connected in series.

5. The on-board charger according to claim 1, one end of the secondary winding being connected to the first rectifier branch between the two MOSFETs and the other end of the secondary winding being connected to the second rectifier branch between the two MOSFETs.

6. The on-board charger according to claim 1, the secondary winding comprising a center-tap dividing the secondary winding into two secondary winding portions, and a secondary switch circuit of the switch circuit comprising a first secondary switch branch and a second secondary switch branch in parallel with each other, the first secondary switch branch connecting the center-tap of the secondary winding to the first rectifier branch between the two MOSFETs, and the second secondary switch branch connecting one end of the secondary winding to the first rectifier branch.

7. The on-board charger according to claim 6, another end of the secondary winding being connected to the second rectifier branch via a second capacitor connected in series.

8. The on-board charger according to claim 3, the bridge circuit further comprising a third capacitor connected in parallel to the first and the second bridge branch and the rectifier circuit further comprising a fourth capacitor connected in parallel to the first and the second rectifier branch.

9. The on-board charger according to claim 1, the on-board charger being a single phase, bidirectional on-board charger.

10. A use of an on-board charger in an electric vehicle, wherein the on-board charger comprises:
   an input power interface being connectable to a power source of a charging system;
   a power factor correction circuit connected to the input power interface;
   an isolated direct current/direct current-converter connected to the power factor correction circuit; and
   an output power interface connected to the isolated direct current/direct current-converter and configured to be connected to the battery of the electric vehicle,
   wherein the power factor correction circuit being configured to vary an output voltage in a defined range, the output voltage being provided at an output voltage link of the power factor correction circuit,
   wherein the isolated direct current/direct current converter comprising:
      a bridge circuit connected to the output voltage link of the power factor correction circuit,
      a transformer circuit connected to the bridge circuit, and
      a rectifier circuit connected to the transformer circuit,
      wherein the transformer circuit comprising at least a transformer comprising a primary winding connected to the bridge circuit, and a secondary winding connected to the rectifier circuit, and
      wherein the primary winding comprising a center-tap dividing the primary into two winding portions, the two winding portions of the primary winding being connected to a primary switch circuit of a switch circuit being configured to change a turn ratio of the transformer circuit by selectively integrating or excluding one of the two winding portions, and
      wherein the primary switch circuit comprising a first primary switch branch and a second primary switch branch in parallel with each other, the first primary switch branch connecting the center-tap to the first primary bridge branch between two MOSFETs, and the second primary switch branch connecting one end of the primary winding to the first primary bridge branch, and the electric vehicle having a 400 volt battery system or an 800 volt battery system.

11. An electric vehicle, comprising:
a battery, and
an on-board charger comprising:
   an input power interface being connectable to a power source of a charging system;
   a power factor correction circuit connected to the input power interface;
   an isolated direct current/direct current-converter connected to the power factor correction circuit; and
   an output power interface connected to the isolated direct current/direct current-converter and configured to be connected to the battery of the electric vehicle,
   wherein the power factor correction circuit being configured to vary an output voltage in a defined range, the output voltage being provided at an output voltage link of the power factor correction circuit,
   wherein the isolated direct current/direct current converter comprising:
      a bridge circuit connected to the output voltage link of the power factor correction circuit,
      a transformer circuit connected to the bridge circuit, and
      a rectifier circuit connected to the transformer circuit,
      wherein the transformer circuit comprising at least a transformer comprising a primary winding connected to the bridge circuit, and a secondary winding connected to the rectifier circuit, and
      wherein the primary winding comprising a center-tap dividing the primary into two winding portions, the two winding portions of the primary winding being connected to a primary switch circuit of a switch circuit being configured to change a turn ratio of the transformer circuit by selectively integrating or excluding one of the two winding portions from the conductive circuit, and
      wherein the primary switch circuit comprising a first primary switch branch and a second primary switch branch in parallel with each other, the first primary switch branch connecting the center-tap to the first primary bridge branch between two MOSFETs, and the second primary switch branch connecting one end of the primary winding to the first primary bridge branch, the output power interface of the on-board charger being connected to the battery.

12. The electric vehicle according to claim 11, the second primary bridge branch comprising a pair of serially connected MOSFETs.

13. The electric vehicle according to claim 11, the rectifier circuit comprising a first rectifier branch and a second rectifier branch connected in parallel with each other, each of the first and the second rectifier branches comprising a pair of serially connected MOSFETs.

14. The electric vehicle according to claim 11, another end of the primary winding being connected to the second primary bridge branch via a first capacitor connected in series.

15. The electric vehicle according to claim 11, one end of the secondary winding being connected to the first rectifier branch between the two MOSFETs and the other end of the secondary winding being connected to the second rectifier branch between the two MOSFETs.

16. The electric vehicle according to claim 11, the secondary winding comprising a center-tap dividing the secondary winding into two secondary winding portions, and a secondary switch circuit of the switch circuit comprising a first secondary switch branch and a second secondary switch branch in parallel with each other, the first secondary switch branch connecting the center-tap of the secondary winding to the first rectifier branch between the two MOSFETs, and the second secondary switch branch connecting one end of the secondary winding to the first rectifier branch.

17. The electric vehicle according to claim 16, another end of the secondary winding being connected to the second rectifier branch via a second capacitor connected in series.

18. The electric vehicle according to claim 11, the on-board charger being a single phase, bidirectional on-board charger.

19. A method for controlling an on-board charger for a battery of an electric vehicle, the method comprising the following steps:
   connecting an input power interface of the on-board charger to a power source of a charging system having a first alternating current (AC) output voltage;
   converting the first AC output voltage into a first direct current (DC) output voltage by means of a power factor correction circuit of the on-board charger connected to the input power interface and varying the first DC output voltage of the power factor correction circuit in a defined range;

providing the first DC output voltage at an output voltage link of the power factor correction circuit connected to a bridge circuit of an isolated direct current/direct current-converter of the on-board charger;

converting the first DC output voltage into a second AC output voltage by means of the bridge circuit;

adapting a turn ratio of a transformer comprising a primary winding and a secondary winding, the primary winding comprising a center-tap dividing the primary winding into two winding portions, the two winding portions being connected to a primary switch circuit of a switch circuit being configured to change the turn ratio of the transformer by selectively integrating or excluding one of the two winding portions from a conductive circuit for changing the output voltage of the second AC transmitted from the primary winding to the secondary winding, and wherein the primary switch circuit comprising a first primary switch branch and a second primary switch branch in parallel with each other, the first primary switch branch connecting the center-tap to the first primary bridge branch between two MOSFETs, and the second primary switch branch connecting one end of the primary winding to the first primary bridge branch;

converting the second AC output voltage into a second DC output voltage by means of a rectifier circuit connected to the transformer circuit; and providing the second DC output voltage at an output power interface connected to the battery of the electric vehicle.

20. The method according to claim 19, the on-board charger being a single phase, bidirectional on-board charger.

* * * * *